United States Patent [19]

Schenk

[11] 3,712,355
[45] Jan. 23, 1973

[54] FLUSH ROTARY FASTENER

[75] Inventor: Peter Schenk, West Islip, N.Y.

[73] Assignee: Dzus Fastener Co., Inc., West Islip, N.Y.

[22] Filed: June 23, 1971

[21] Appl. No.: 155,904

[52] U.S. Cl. ................................ 151/2, 151/25 R
[51] Int. Cl. .............................. F16b 39/00
[58] Field of Search .......... 151/2, 19 A, 30, 24, 25 R, 151/25 A, 25 B, 25 C, 9, 6, 11, 40, 50, 69, 41.71, 41.76

[56] References Cited

UNITED STATES PATENTS

| 994,688 | 6/1911 | Parks | 151/25 A |
|---|---|---|---|
| 1,253,958 | 1/1918 | Godwin | 151/24 |
| 2,433,138 | 12/1947 | Marcell | 151/9 |
| 2,477,429 | 7/1949 | Swanstrom | 151/41.76 |
| 2,649,126 | 8/1953 | Timmerman | 151/41.76 |
| 2,742,072 | 4/1956 | Murphy | 151/9 |
| 2,886,089 | 5/1959 | Schlage | 151/25 R |
| 3,037,542 | 6/1962 | Boyd | 151/69 |
| 3,116,775 | 1/1964 | Russell | 151/25 R |
| 3,221,589 | 12/1965 | Vander Sande | 151/69 |

FOREIGN PATENTS OR APPLICATIONS

| 876,636 | 9/1961 | Great Britain | 151/7 |
|---|---|---|---|
| 34,856 | 7/1925 | Denmark | 151/6 |

*Primary Examiner*—Marion Parsons, Jr.
*Attorney*—Kane, Dalsimer, Kane, Sullivan & Kurucz

[57] ABSTRACT

A rotary fastener assembly for joining two members having infinite locked positions and which requires a minimum turning torque to reach the desired locked position and a substantially greater turning torque to unlock the assembly and permit the fastener to be easily disassembled thereafter.

7 Claims, 8 Drawing Figures

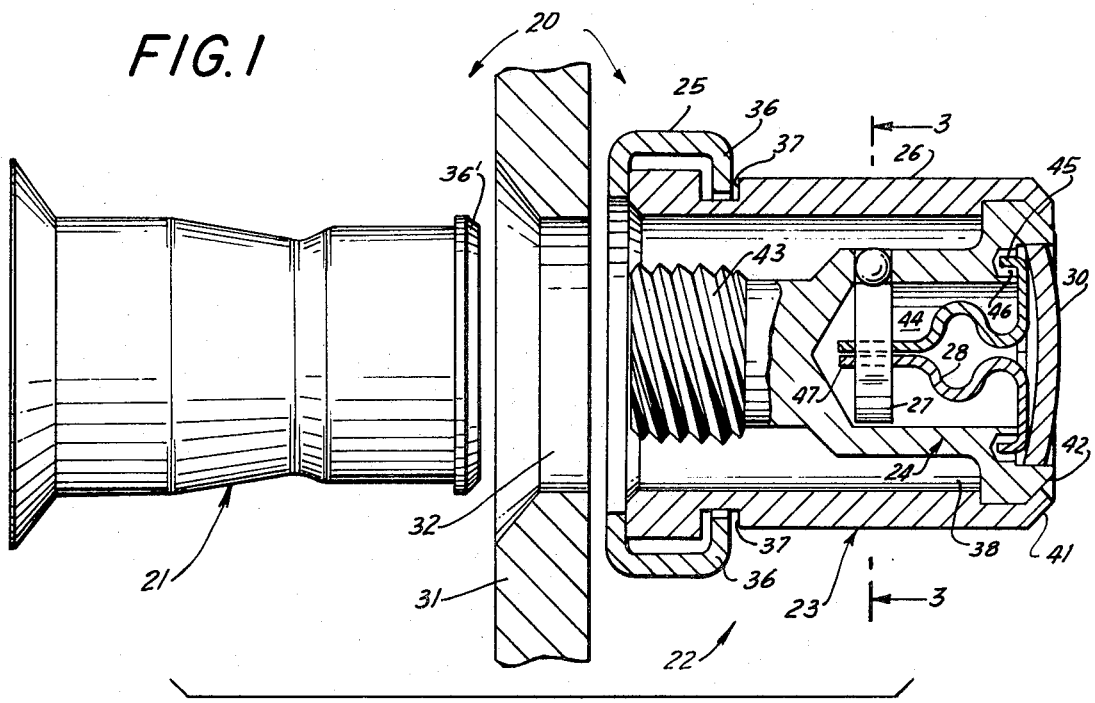
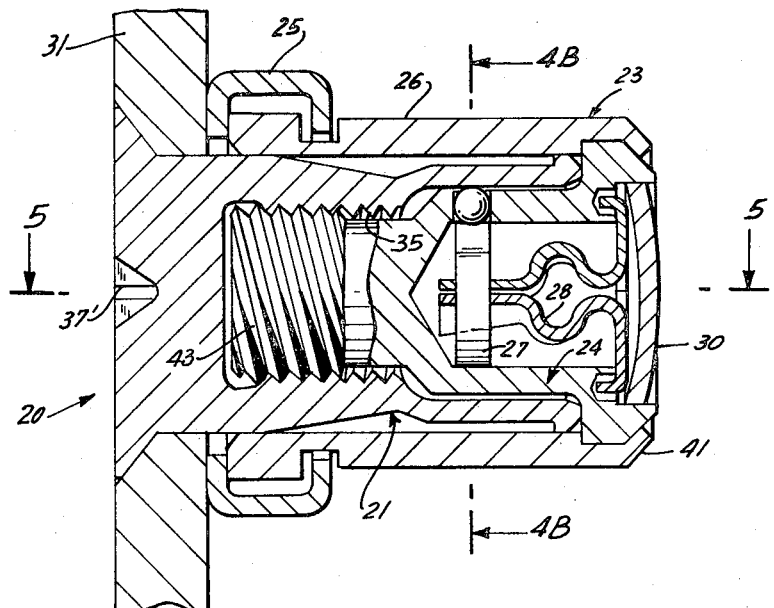

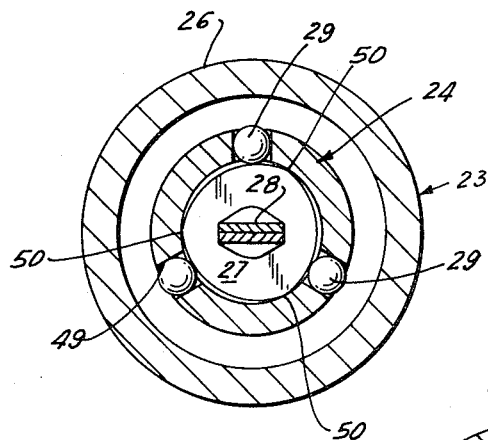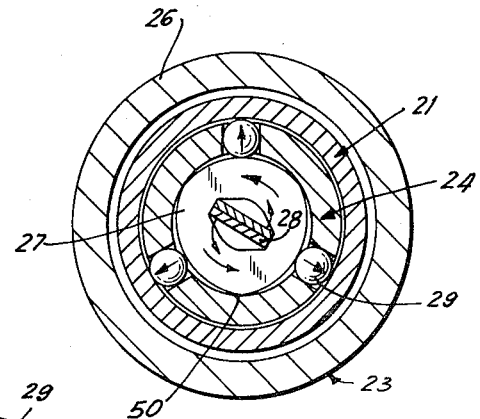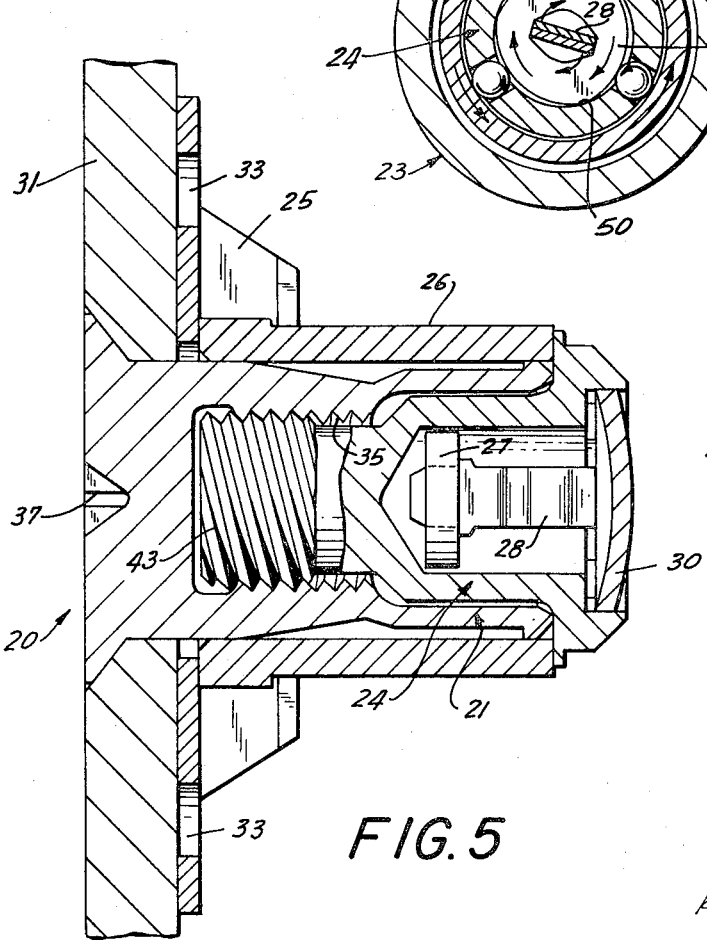

FLUSH ROTARY FASTENER

BACKGROUND OF THE INVENTION

When working with rotary-type fasteners, it is often desirable to employ some type of locking means to retain the fastener parts in the locked position. The retention means is desirable so that vibrations do not cause the fastener to loosen causing possible disassembly of the joined members and also to provide positive locking engagement so that there is no relative movement between the respective members of the fasteners and the joined members. The locking means utilized in this type of a fastener often is of the type which is provided by interference between parts of the fastener assembly. After locking, when it is desired to unlock, a greater force than is normally necessary to rotate one portion of the fastener with respect to the other is often needed to unlock the fastened parts.

Several different types of rotary fasteners which lock in the manner described above are presently available. In one type of embodiment ratchet type interfaces are employed on the moving part and the stationary part respectively so that a greater than normal turning torque is required to move one member with respect to the other. Naturally, the interengagement between the ratchet faces form interference to prevent loosening of one member with respect to the other when the assembly is in the locked position. When it is desired to unlock this type of arrangement, once again the same type of force is required to disassemble one member from the other. It can be readily seen in the ratchet type of arrangement that there has to be considerable interference between the members in order to have a positive locking arrangement and therefore a high turning torque is required during the interengagement of these members in the unlocking and locking processes. Additionally, it should also be kept in mind that the ratchet faces can only lock the assembly when they are in engagement with one another. Consequently, there is a limited number of locking positions for the assembly particularly if the ratchet faces are of limited length and engagement.

Another type of rotary fastener of the type under consideration is one which employs friction means. This is somewhat similar to the ratchet concept with the exception that rather than an interface meeting between teeth there is an interference fit between surfaces so that a considerable turning torque is required in order to move a rotary fastener portion with respect to the stationary fastener portion. Once again the locking force is only as great as the interference friction force and the greater the interference the more difficult it is to turn one portion of the fastener with respect to the other.

A third type of rotary fastener presently available is one which employs a spring lock. In that type of fastener the rotary portion is rotated until a spring is displaced by means of a force being placed on the spring to move it from an unlocked position to a locked position. Thereafter, to unlock that type of fastener, it is necessary to employ sufficient force to release the spring from its biased position to allow it to return to its relaxed position. The difficulty with that type of fastener is that there is only one locked position and the fastener will only be readily adaptable for fastening members of specific diameters.

From the above, it is readily apparent that there is a need in the art for a rotary fastener which has an infinite number of locking positions, has a minimum turning torque while moving the rotatable member with respect to the stationary member into the locked position. Additionally, a fastener which also provides a locking arrangement whereby a substantially greater turning torque is required to initiate the unlocking of the fastened assembly and which then only utilizes a minimum turning torque for complete disassembly would also be extremely advantageous in the art. Naturally, the fastener assembly must be of simplicity in design and relatively inexpensive in order to replace the above discussed types of fasteners. A fastener of this type would be extremely advantageous in substitution for the above types of structures and for avoiding the shortcomings of those structures discussed above which are now available.

SUMMARY OF THE INVENTION

In view of the above discussion, it is among the primary objectives of this invention to provide a rotary fastener assembly having infinite locked positions and which requires a minimum turning torque to reach the desired locked position and a substantially greater turning torque to unlock the assembly and permit the fastener to be easily disassembled thereafter.

The fastener includes a stud member adapted to be rotatably mounted on one of the members to be joined and having surfaces thereon forming a partially threaded annular recess in one portion thereof. A receptacle is provided which is adapted to be mounted in fixed position on the other of the members to be joined and has means thereon to facilitate removable attachment to the stud member. The receptacle includes a hollow outer housing with an inner diameter large enough to receive the stud interiorly thereof. A nut housing is mounted in the hollow outer housing and has an outer diameter which is less than the inner diameter of the recessed portion of the stud so that the stud may be received between the outer housing and the nut housing. One end portion of the nut housing has a threaded outer surface positioned so as to interengage with the partially threaded portion of the stud. Finally, locking means are provided on the receptacle and positioned with respect to the stud so that when the stud is in threaded interengagement with the receptacle the locking means will permit the stud to be rotated into the locked position with a minimum turning torque and will retard rotation of the stud in the opposite direction such that a substantially greater turning torque is required to initiate rotation in the opposite direction thereby locking the fastener assembly.

Therefore, in summary, the fastener assembly includes a stud member adapted to be rotatably mounted on one of two members to be joined and a receptacle which is adapted to be mounted in fixed position on the other of two members to be joined. Means are included on the receptacle to facilitate a removable attachment to the stud member. Locking means are provided on the receptacle and positioned so as to cooperate with surfaces on the stud in order that when the stud and receptacle are being attached, the locking means will permit the stud to be rotated into the locked position with a minimum turning torque and will retard rotation of the stud in the opposite direction such that a substantially greater turning torque is required to initiate rotation in the opposite direction thereby locking the fastener assembly. In this manner, a rotary fastener assembly is provided with infinite locked positions and which requires a minimum turning torque to reach the desired locked position and a substantially greater turning torque to unlock the assembly and permit the fastener to be easily disassembled thereafter.

With the above objectives, among others, in mind reference is made to the drawings.

BRIEF DESCRIPTION OF THE DRAWINGS

In the drawings:

FIG. 1 is a partially sectional side elevation view of a fastener assembly of the invention in disassembled condition;

FIG. 2 is a sectional side elevation view thereof with the fastener in locked position;

FIG. 3 is a sectional end view thereof taken along the plane of line 3—3 of FIG. 1;

FIG. 4a is a sectional end view thereof with arrows showing movement of the respective parts of the assembly from the unlocked to the locked position;

FIG. 4b is a sectional end view thereof taken along the plane of line 4b—4b of FIG. 2 with arrows showing the direction of force initiated by the spring;

FIG. 4c is a fragmentary sectional end view thereof showing the deformation of the stud member as the unlocking process is initiated;

FIG. 5 is a sectional side elevational view thereof taken along the plane of line 5—5 of FIG. 2.

DESCRIPTION OF THE PREFERRED EMBODIMENT

Figure 6:
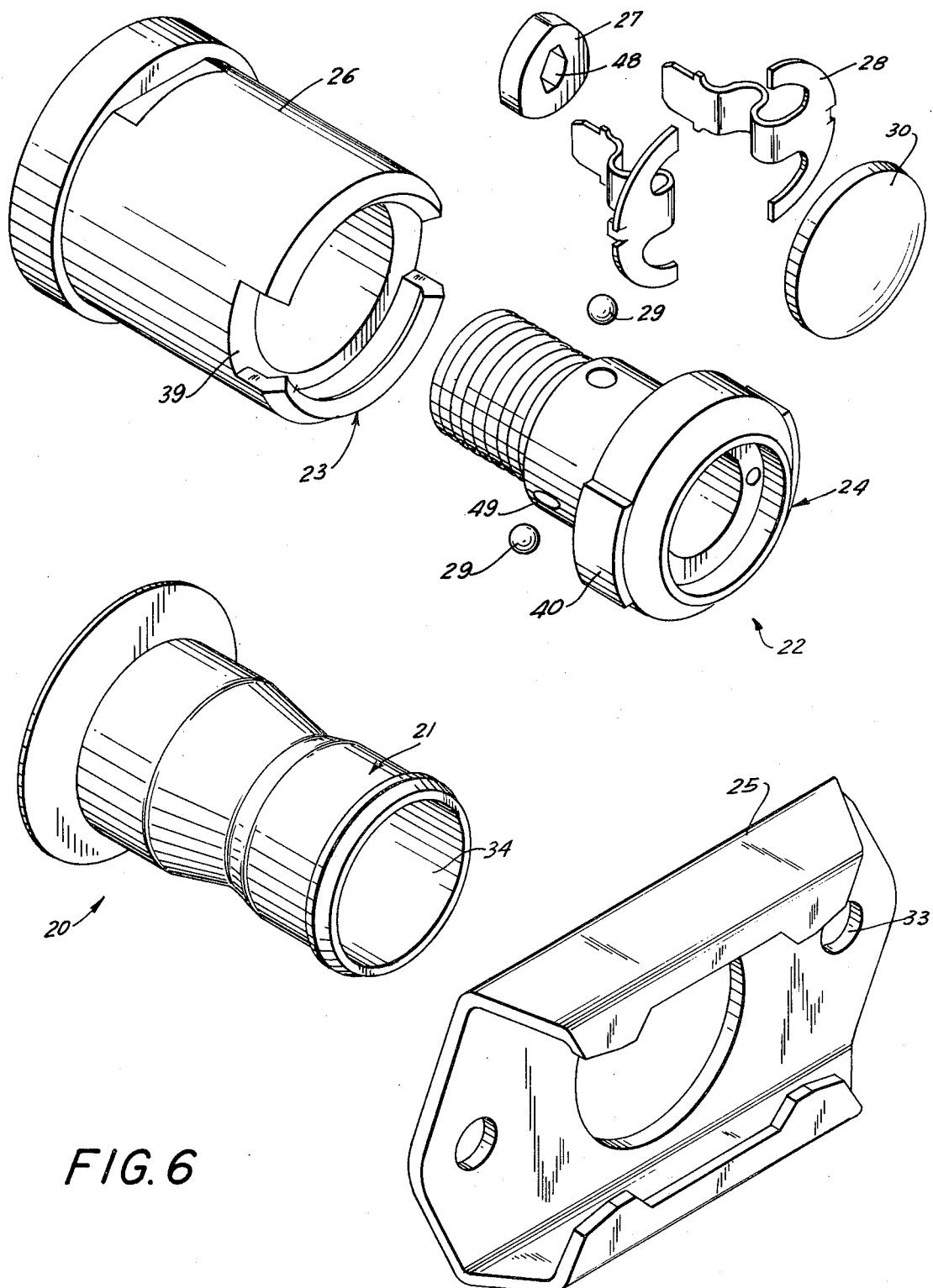
FIG. 6 is an exploded perspective view of the rotary fastener assembly of the invention.

The rotary fastener assembly 20 includes a number of components which can be most easily noted in the exploded view of FIG. 6. Initially, it should be noted that there is a stud member 21 which is the rotating portion of the assembly 20. A stationary receptacle portion 22 is designed to receive the rotating stud member 21. If two members are to be joined, stud member 21 would be connected to one of the members to be joined and the receptacle 22 would be connected to the other of the members to be joined.

Receptacle 22 includes an outer housing 23 and an inner nut housing 24. Outer housing 23 is a two-part assembly including base portion 25 and body portion 26. Housed within a chamber in nut housing 24 as will be described in detail below are a number of elements which apply the locking force to assembly 20. These elements include an eccentric cam 27, a leaf spring 28 and three balls 29. For convenience purposes, leaf spring 28 is constructed of a pair of complementary members. In the embodiment shown, there are three balls 29, however, the number of balls employed is a matter of choice. The final element of the assembly is a cap 30 which is mounted in nut housing 24 and serves to retain the elements located within nut housing 24 in position. All of the elements of the assembly may be of a common type of metal or plastic material normally utilized in fasteners of this type. The only other critera of note is that the stud member be constructed of a resilient deformable material to facilitate operation of assembly 20 as will be described in detail below.

By way of example, FIGS. 1 through 5 show the assembly 20 being mounted to a single panel 31. Naturally, in common use receptacle 22 would be mounted on one member to be joined and stud 21 would be mounted to another member to be joined. However, in the drawings, both the stud and the receptacle portions of assembly 20 are mounted to panel 31. As shown, panel 31 has an opening 32 therethrough through which 21 is extended and in which the stud is rotatably retained by means of the flanged interengagement between the ear end of the stud and the counterbore of opening 22. As shown in FIG. 6, base portion 25 of outer housing 23 contains a pair of openings 33 through which bolts may extend to fasten receptacle 22 to one side of panel 31.

Turning particularly to the shape of stud 21 it should be noted that the major portion of stud 21 is cylindrical in shape and contains recess 34 therein which extends for the majority of the length of stud 21. The forward portion of recess 34 is of a slightly larger diameter than the rear portion of the recess while the rear portion of recess has a threaded circumferential surface 35. Adjacent the forward rim of stud 21 an annular flange 36' is present for engagement with the inner surface of housing 23 for locking purposes as will be discussed below. An appropriate groove 37' is positioned in the rear head portion of stud 21 for reception of a tool to rotate the stud with respect to panel 31 and receptacle 22 during the locking and unlocking functions.

As previously discussed, outer housing 23 includes a base portion 25 and a body portion 26. Base portion 25 includes a pair of rearwardly and then inwardly extending flanges 36 which are designed to mate with appropriate notches 37 in the outer surface of body 26 to lock body 26 to base 25 to form housing 23. As previously discussed, base 25 is then bolted to panel 31 or an appropriate member to be joined. Body 26 is of a hollow cylindrical configuration having a passageway 38 therethrough. Mounted in passageway 38 is nut housing 24 and the remaining elements of fastener assembly 20. The rear end surface of body 26 contains a pair of opposed recesses 39 adapted to receive corresponding flanges 40 on nut housing 24. Additionally, the rear rim 41 of body 26 where it is not interrupted by recesses 39 is tapered inwardly so as to engage with a corresponding tapered rear surface 42 on nut housing 24. The combination of recesses 39 and tapered rim 41 along with the corresponding surfaces on nut housing 24 serve to retain nut housing 24 in fixed non-rotatable position within housing 23 during the locking and unlocking of assembly 20. Similarly, flanges 36 and corresponding recesses 37 in body 26 prevent rotation of body 26 with respect to base 25. In turn, base 25 is prevented from rotation by its being bolted through openings 33 to panel 31.

The forward end portion of nut housing 24 has a threaded outer surface 43 positioned for interengagement with the threaded inner surface 35 on stud 21. The choice of threaded surfaces is a matter of convenience for the particular use. Whether the corresponding threaded surfaces are on the interior of stud 21 and the exterior of a surface of the receptacle or, in the alternative, if an exterior surface of the stud and an interior surface of the nut housing are employed to contain the threads is dependent upon the particular needs of the user. For descriptive purposes, only one embodiment is depicted herein. Similarly, the relative positioning of the locking means with respect to the stud and the manner in which surfaces are deformed to achieve the locking function is dependent upon the particular application which the user envisions. For exemplary purposes, once again, only one such embodiment is depicted and described in detail in the present disclosure.

The rear end portion of nut housing 24 contains an interior chamber 44 which houses the responsive elements of the locking mechanism. Within chamber 44 is cam 27 and leaf spring 28. The rear flanges 45 of leaf spring 28 are positioned in corresponding depression 46 within nut housing 24 so as to retain one end of leaf spring 28 in relatively fixed position. Since there are two complementary parts to leaf spring 28, there are two respective flanges 45 and two corresponding depressions 46. The other ends 47 of leaf spring 28 are positioned in central opening 48 of cam 27. The relative engagement between spring ends 47 and cam opening 48 is best seen in FIGS. 3–4c. Opening 48 is shaped so that it retain ends 47 in fixed position within the opening. Therefore, when cam 27 is rotated the ends 47 of spring 28 will also be rotated due to their interengagement with the surfaces of opening 48 thereby causing a load to be placed upon spring 28. The bias applied to spring 28 will be retained until the cam is free to rotate once again at which time spring 28 will tend to return to its relaxed position and ends 47 will rotate cam 27 appropriately.

The outer circumferential eccentric surface of cam 27 is tri-chordal in nature. This is due to the fact that each of the three segments is designed to contact one of three balls 29. Balls 29 are mounted by means of an interference fit in openings 49 in nut housing 24. There are three openings 49 which correspond to the three balls 29, and the openings extend from the outer surface of nut housing 24 to the interior chamber 44 of nut housing 24. The openings 49 and therefore balls 29 are aligned with cam 27 located in chamber 44. Since the outer surface of cam 27 is eccentric so as to move between a low point and a high point each ball 29 is responsive to the outer surface of cam 27 as a cam follower is to a cam surface. The tri-chordal arrangement is designed so that each of the three segments meets the adjacent segment at a high point 50 on the outer cam surface of cam 27. The two segments which meet at each high point 50 then fall away from the high point in a similar manner. It can be readily seen that the closer to the high point 50 one is on cam surface 27 and in engagement with balls 29 the more balls 29 will be forced outwardly in respect to nut housing 24. In this manner a greater or lesser portion of ball 29 is exposed exteriorly of the outer surface of nut housing 24 for engagement with the inner surface of stud 21.

The rear opening to chamber 44 in nut housing 24 is sealed by means of cap 30. The exterior rim of cap 30 is frictionally engaged with corresponding rim at the rear end of nut housing 24. Cap 30, in addition to closing chamber 24 retains rear end flanges 45 of spring 28 in recesses 46. This maintains the rear ends of spring 28 in fixed position during operation of assembly 20.

In operation, the normal position of cam 27 with spring 28 in the unbiased position is such that balls 29 are either directly in contact with high points 50 or in contact with the cam surfaces adjacent to high points 50. In that position, balls 29 are exposed to the maximum degree exteriorly of nut housing 24. Since spring 28 is in the relaxed position when balls 29 are at or near maximum exposure, no matter in which direction a force is applied to spring 28 it will tend to return to the relaxed position and consequently move balls 29 to their maximum exposure beyond the outer surface of nut housing 24.

Therefore, initially with the above in mind, when the parts of assembly 20 are positioned as shown in FIG. 1, balls 29 are at a point of maximum exposure. Stud 21 is then inserted into receptacle 22 by passing it through panel 31. When threaded inner surface 25 of stud 21 engages with threaded outer surface 43 of nut housing 24, stud 21 is rotated in a manner which threads it into receptacle 22. As rotation is started, as shown in FIG. 4a, the bearing members or balls 29 are contacted and rotated in a corresponding fashion. Balls 29 being in contact with cam 27 in turn rotate cam 27, as shown, away from high points 50. This movement of cam 27 biases spring 28 thereby placing a load on spring 28. Once the cam has been rotated a sufficient distance from the high point, balls 29 will have been moved inwardly with respect to nut housing 24 and will have relatively free rotational movement corresponding to the rotational movement of stud 21. Since the cam has been rotated to its low point, there is no further rotational force applied to cam 27 and consequently no further load on spring 28. It should be kept in mind that stud 21 is of a deformable resilient material so that upon initial contact with outwardly extending balls 29 there will occur a certain amount of deformation of stud 21 as it begins movement with respect to balls 29 and causes balls 29 to move cam 27 from the high points 50 to a low point on the cam. Once the deformed portion of stud 21 passes from contact with balls 29 the resilient nature of the stud body will cause it to return to its initial configuration.

With the balls 29 having been moved forwardly by rotation of cam 27 to bring the low points of the cam in contact with the balls, only a minimum turning torque is required to continue threading stud 21 into the desired locked position. However, should it be desirable to stop the rotation of stud 21 at any point the assembly will automatically lock the stud to the receptacle at that point. This action is accomplished by the stopping of rotation of stud 21 which in turn stops a responsive rotation of balls 29. This permits the spring to attempt to return to its relaxed and normal position and in turn rotate cam 27 toward high points 50. This action places an outward force on balls 29 as the cam exerts a force to return to the high points. This forces a type of wedging action which wedges balls 29 outwardly into locking contact with the inner surface of stud 21. As stated above, this locking action will occur whenever rotation of stud 21 is stopped no matter where it is located with respect to receptacle 22 in its threaded interengagement therewith.

Generally as shown in FIGS. 2 and 5, stud 21 will be rotated until it is entirely seated within receptacle 22 and is substantially flush at its rear surface with the rear surface of panel 31. The same type of wedging locking action as discussed above will take place at that final seated position also. The direction of forces applied during the locking action is shown with the assistance of arrows in FIG. 4b.

When it is desired to unlock the assembly and remove stud 21 from receptacle 22, an initially greater turning torque is required to initiate the unlocking action. This is primarily due to the fact that sufficient force is required to rotate stud 21 across the ball 29 at the maximum exposed position of ball 29 and in turn rotate cam 27 over high point 50 to the other side thereof thereby applying a reverse bias than that discussed above to spring 28. As stud 21 moves with respect to ball 29 in its maximum exposed position and in turn causes ball 29 to rotate cam 27 over high point 50, there is noticeable deformation of stud 21 as can be seen in FIG. 4c. This occurs until cam 27 has once again been brought into a position where some other portion of the cam surface then high point 50 is in contact with each ball 29. Once again the resilient nature of stud 21 permits the stud to return to its initial configuration once the point of deformation has been passed. It can be readily seen that a considerable turning torque is required in order to cause the noted deformation of stud 21 and to pass cam 27 from one side of the high point to the other. This high turning torque is what is required to unlock the assembly. Naturally, the particular force required is dependent upon the materials used and the various tolerances employed. It is purely a matter of choice. Naturally, the force required should be sufficient to avoid loosening such as by vibration during normal activity yet which does not require abnormally high initial turning torque to begin disassembly and to unlock the rotary fastener.

Once the initial force is applied and cam 27 has been rotated sufficiently to pass high point 50 beyond balls 29, only a minimum turning torque is required to continue rotation and disassembly of the respective parts. This action is identical to the action between the stud and the receptacle during the locking process in the opposite direction. Only a minimum turning torque is required. As stated above, for complete disassembly, all that need be done is minimum turning torque be utilized to completely disengage the threaded interengagement between stud 21 and nut housing 24 and remove the parts to the position as shown in FIG. 1. If during disassembly it is desired to lock the stud in a partially engaged position, a slight turn in the direction of engagement will position the cam into a locked position to prevent disengagement. Once disassembly has been accomplished, springs 28 will once again return cam 27 to the initial position which will expose balls 29 a maximum amount beyond the outer surface of nut housing 24 where receptacle assembly 22 is once again ready to receive stud 21 upon reuse of assembly 20.

Thus, the above discussed objectives of the invention are most effectively attained.

I claim:

1. A rotary fastener assembly for joining two members having infinite locked positions and which requires a minimum turning torque to reach the desired locked position and a substantially greater turning torque to unlock the assembly and permit the fastener to be easily disassembled thereafter comprising:

a stud member adapted to be rotatably mounted on one of said members to be joined;

a receptacle adapted to be mounted in fixed position on the other of said members to be joined and having means thereon to facilitate a removable attachment to said stud member; and locking means including a bearing member in communication with a spring biased cam member on the receptacle to cooperate with surfaces on the stud and the bearing member positioned with respect to said stud so that when said stud is being attached to said receptacle and in engagement with said bearing member, said locking means will permit said stud to be rotated substantially free of any retarding friction into the locked position with a minimum turning torque and will retard rotation of the stud in the opposite direction such that a substantially greater turning torque is required to initiate rotation in the opposite direction thereby locking the fastener assembly.

2. The invention in accordance with claim 1 wherein at least one of said stud and said receptacle is deformable and resilient and positioned with respect to said locking means so that upon engagement of said locking means maximum deformation will occur thereby requiring a predetermined turning torque for rotation and when said locking means is disengaged a substantially lesser turning torque than the predetermined turning torque is required for rotation.

3. A rotary fastener assembly for joining two members having infinite locked positions and which requires a minimum turning torque to reach the desired locked position and a substantially greater turning torque to unlock the assembly and permit the fastener to be easily disassembled thereafter comprising:

a stud member adapted to be rotatably mounted on one of the members to be joined and having surfaces thereon forming a partially threaded annular recess in one end portion thereof;

a receptacle adapted to be mounted in fixed position on the other of said members to be joined and having means thereon to facilitate a removable attachment to said stud member;

said receptacle including a hollow outer housing with an inner diameter large enough to receive the stud interiorly thereof;

a nut housing mounted in said hollow outer housing and having an outer diameter which is less than the inner diameter of the recessed portion of said stud so that said stud may be received between said outer housing and said nut housing;

one end portion of said nut housing having a threaded outer surface positioned so as to interengage with said partially threaded portion of said stud;

locking means on said receptacle and positioned with respect to said stud so that when said stud is in threaded interengagement with said receptacle said locking means will permit said stud to be rotated into the locked position with a minimum turning torque and will retard rotation of the stud in the opposite direction such that a substantially greater turning torque is required to initiate rotation in the opposite direction thereby locking the fastener assembly;

said nut housing containing a chamber therein;

at least one side opening in said nut housing permitting communication between said chamber and the exterior of said nut housing;

a bearing member movably mounted in each of said access openings;

a cam in said chamber in contact with each of said bearing members;

a spring mounted in said chamber and connected to said cam so as to bias said cam against said bearing members and consequently bias said bearing members so that they extend a predetermined amount exteriorly of said nut housing; and said stud being deformable and resilient so that when said stud is rotated with respect to said nut housing initially the resilient stud will deform and will move the bearing member and the cam against the bias of the spring thereby moving each of the bearing members inwardly with respect to the nut housing and permitting rotation of the stud with respect to the nut housing with minimum torque required, and when rotation of the stud in the locking direction is stopped, the spring will tend to return the cam and bearing members to their initial position thereby wedging the bearing members against the inner surface of the stud and locking the stud in position with respect to the receptacle.

4. The invention in accordance with claim 3 wherein a substantially greater turning torque is employed to rotate the stud in the unlocking direction in order to deform the resilient stud member and permit the bearing members to reach their fully exposed position and to be displaced inwardly again by moving the cam in a second direction against the bias of the spring thereafter permitting free rotation of the stud member with respect to the nut housing in the unlocking direction. Once in the unlocked position it will not lock against further unlocking until the stud is turned to the assembly position placing the cam and balls into a position preventing unlocking.

5. The invention in accordance with claim 3 wherein the nut housing has a removable cap on one end thereof so as to enclose the chamber and locking means contained therein.

6. The invention in accordance with claim 3 wherein each of said bearing members is a rotatable ball and there are three balls interspaced on the circumference of the nut housing.

7. The invention in accordance with claim 3 wherein the outer housing includes a base portion with means thereon for fastening the base portion to one of the members to be joined and the base portion having a pair of opposed flanges, the remainder of said outer housing being a cylindrically shaped body portion having a hollow interior with the nut housing mounted therein and having a pair of opposed notches on the outer surface thereof with each notch being positioned so as to receive a respective flange of the base portion so as to provide an interconnected outer housing adapted to be connected to one of the members to be joined and adapted to mount the nut housing interiorly thereof in fixed position.

* * * * *